Sept. 1, 1959 L. DAY ET AL Re. 24,694

LUBRICATOR AND SEALING DEVICE

Original Filed June 22, 1953

INVENTORS.
LESLIE DAY
BY WILLIAM A. MACNERLAND
J. C. Baisch
ATTORNEY

United States Patent Office

Re. 24,694
Reissued Sept. 1, 1959

24,694

LUBRICATOR AND SEALING DEVICE

Leslie Day and William A. MacNerland, Chicago, Ill.

Original No. 2,846,279, dated August 5, 1958, Serial No. 363,348, June 22, 1953. Application for reissue November 3, 1958, Serial No. 773,130

20 Claims. (Cl. 308—87)

Matter enclosed in heavy brackets [ ] appears in the original patent but forms no part of this reissue specification; matter printed in italics indicates the additions made by reissue.

This invention relates generally to lubricating devices and relates more particularly to lubricators for the journals of railroad cars and the like.

It is an object of the invention to provide means for the proper lubrication of such journals.

It is another object of the invention to provide a device of this character that is leak proof and which will eliminate or minimize leakage when used on "floating" shafts or "shifting" journals.

Still another object of the invention is to provide for freer application of oil to the journal.

A further object of the invention is to provide a device of this character which substantially eliminates throwout of oil in traffic.

A still further object of the invention is to provide a device of this character having means for easily checking the oil level therein.

Another object of the invention is to provide a device of this character wherein the journal is partly immersed in the lubricant when the reservoir of said device is substantially full.

Still another object of the invention is to provide a device of this character which has means for wiping off surplus oil from the face of the rotating journal, leaving only the desired film.

A further object of the invention is to eliminate the relatively loosely packed cotton waste or wool which is at present used in journal housings and thereby eliminates waste grab which is a potent cause of hot boxes.

A still further object of the invention is to provide a device of this character which seals out dust and dirt, saves oil and maintenance costs and provides positive lubrication without altering existing bearings and associated parts.

Another object of the invention is to provide a device of this character that is resistant to decay caused by oil.

Still another object of the invention is to provide a device of this character that has means for aiding in the insertion thereof into journal boxes.

The characteristics and advantages of the invention are further elaborated on in the following detailed description of the accompanying drawings which represent one embodiment of the invention. After considering this example, skilled persons will understand that many variations may be made without departing from the principles disclosed; and the employment of any structures, arrangements, or modes of operation that are properly within the scope of the appended claims is contemplated.

Referring to the drawings, which are for illustrative purposes only,

Figure 1:
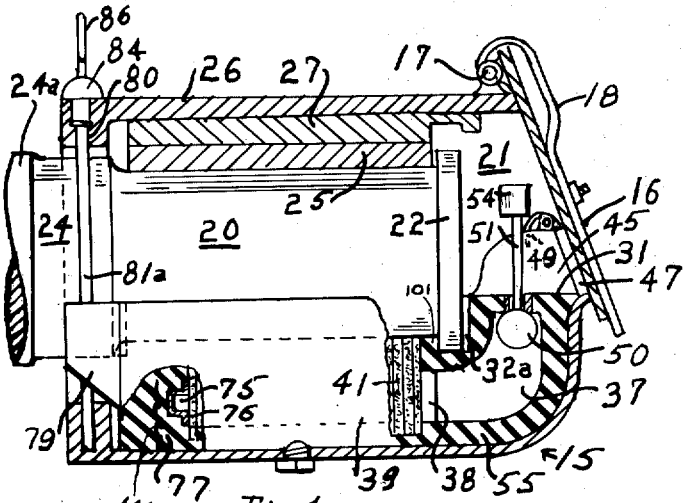
Fig. 1 is a vertical longitudinal section of a journal box showing a journal therein and a lubricating device embodying the invention operably positioned in said box, portions of said device being broken away.

Referring now to Fig. 1, the journal box is indicated generally at 15 and is provided with a lid or cover 16 hinged at 17 and having a spring 18 urging same in the closing direction. A journal 20 is operably disposed in the chamber 21 defined by the box 15 and said journal has a collar 22 adjacent the free end thereof, there also being an inner journal collar 24 and hub 24a. The usual bearing or brass 25 is provided at the top side of the journal and between said bearing 25 and the top wall 26 of the journal box 15 is the usual wedge or key 27.

Occupying the lower portion of the chamber 21 is a lubricator device, indicated generally at 30, which comprises a body generally semicircular in cross section. The rounded part of the body is at the bottom and the upper side includes a top wall, part of which is generally horizontal and disposed at what will be termed the outer end for the purpose of clear terminology. There is a depressed portion of said top wall which extends inwardly from the part 31 and along the longitudinal center of the body. This depressed portion is generally arcuate in cross section and includes a groove 32 in which the collar 22 of the journal shaft is operably disposed, said groove 32 being at the inner end of the wall part 31. The outer face of the collar 22 is spaced at 32a from the adjacent end of the groove 32. From the groove 32 a concave recess or journal receiving portion 33 extends toward the inner end of the body and the journal 20 is operably disposed in said portion 33. At the inner end of the body there is a groove 34 in which the inner collar portion 24 is operably received. At each side of the top of the body the upper wall extends inwardly from the part 31 in substantially the same plane, as indicated at 35, portions 35 being disposed at opposite sides of the groove 32, portion 33 and groove 34.

Figure 3:
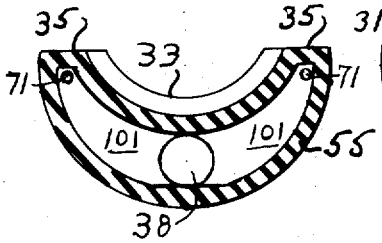
Fig. 3 is a section taken on line 3—3 of Fig. 2.
Figure 4:
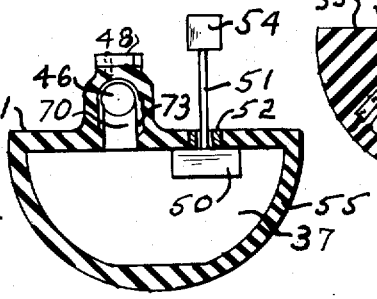
Fig. 4 is a section taken on line 4—4 of Fig. 2.

The body 30 has a hollow interior which includes a chamber 37 at the outer end and a passage 38 which connects the chamber 37 through wall 101 (Figs. 1 and 3) with a wick chamber or portion 39 located intermediate the ends of the body. Chamber 39 is open at the top as indicated at 40 and the upper ends of wicks 41 extend into said opening 40.

The outer end is provided with a filling spout 45 which extends upwardly above the upper surface of the wall part 31 and turns toward the outer end of the body, terminating at an angle corresponding to the angle of the cover 16. There is a filling opening 46 closed by a cover 47 hinged at its upper end to the spout by a hinge 48 and urged closed by a spring 49. When the device is in position in the journal box the cover 47 lies closely adjoining the inner surface of the cover 16, and is further secured and held in place by lid 16.

The chamber 37 constitutes a relatively large reservoir and an oil level indicator is provided comprising a cylindrical float 50 from which a flexible shaft or rod 51 extends upwardly through an opening provided in the wall part 31. A metal sleeve or bearing 52 is provided for the flexible rod or shaft 51 and receives said rod loosely enough to provide an air vent to the reservoir. At the upper end of the rod 51 is an indicator 54 which may be of white painted cork or any other suitable material.

The body of the lubricator is of resilient material and neoprene has been found to be particularly good for the purpose. The oil wicks are also of any suitable material and may be pleated or braided cotton cord, wool or plastic for example. The wicks are positioned in the oil chamber or reservoir 39 and may have their lower ends moulded into the bottom of the lower wall 55. The upper ends of the wicks extend through the opening 40 and into a position whereat they rest against the lower portion of the journal 20 when the lubricator device is installed in the journal box or housing underneath said journal.

The device is placed in position in the journal box when the wedge and brass are not in place and the journal is at its highest possible position inside the box or housing. When the device has been properly placed underneath the journal the latter is lowered with relation to the box and the brass and wedge installed in position in the well-known manner. The relative lowering of the journal in the box causes enough compression of portions of the body by the journal in such manner that the sides 35 and 35a and end walls 77 and 101 of the device will form an oil tight contact or seal with the abutting faces of the journal for the full perimeter of the wick reservoir, extending from a point adjacent the outer end collar to a point adjacent the inner collar 24. The resiliency of the device will compensate for the movements of the journal in relation to the housing thereof when the car is in traffic and prevent the seal between the parts from being broken in use.

When the lubricating device, journal, brass and wedge are assembled in their operative positions the upper ends of the wicks will be in contact with the lower outside portion of the journal inside the sealed wick reservoir 39 created inside the body of the device and around the wicks. The swell of the neoprene body, due to contact with and absorption of oil compensates for wear on the body and wicks.

Figure 7:
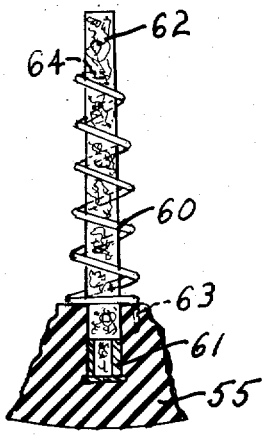
Fig. 7 is an enlarged view of one type of wick for the device.
Figure 2:
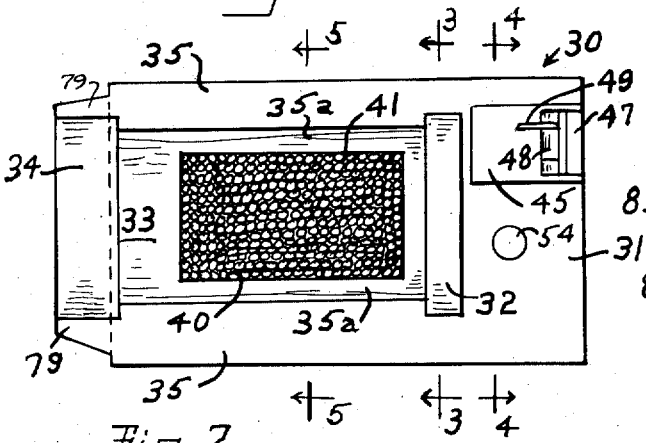
Fig. 2 is a plan view of said lubricating device.

The wicks may be of the self supporting type to keep them erect in their position against the journal or they may be held upright by a spring 60 or the like as shown in Fig. 7. The wick arrangement shown in Fig. 7 includes a metal band or clamp 61 in which the lower ends of the respective wicks 62 are received and said lower ends and bands are moulded into the neoprene of the bottom 55. The spring 60 tapers inwardly from the bottom to the top. This gives a relatively large base for the spring which prevents the displacement of the wick from the upright position with reference to the bottom of the reservoir 39. The respective ends 63 64 of the spring are embedded in the bottom wall 55 and the wick 62. The end portion 63 prevents displacement of the lower end of the spring and the end 64 engages the wick. It is to be noted that the spring is under compression when thus installed so that said spring maintains the wick in contact with the bearing face of the journal.

An alternative wick may be formed of neoprene in tubular shape. It has been found that neoprene and some types of plastics are quite efficient. In such construction the passages in the tubes are of capillary size and the tubes are provided with holes at or near the bottom of the reservoir in order to permit the oil to enter the tube, whereupon capillary action raises the oil to the journal face. Capillary tubing when used in place of the other types of wicks is also moulded into the bottom of the reservoir 39 in any suitable manner. The longitudinal passages in the capillary tubing may be tapered with the opening at the top of smaller diameter than at the bottom and the outside diameter of the tubing may also be smaller at the top than at the bottom to better accommodate to the shape of the reservoir 39.

Oil, of any suitable characteristics, with or without additives such as graphite for improving lubrication, is poured into the device through the filling opening 46 and flows through the passage 70 into the reservoir 37. The cap 47 must, of course, first be raised. The oil from reservoir 37 enters the wick holding reservoir 39 through the passage 38 and will fill said reservoir 39. Air from the reservoir 39 escapes therefrom through vents 71 as the oil level rises in said reservoir 39. The vents 71 lead to the reservoir 37 which is vented to outside atmosphere by way of the bearing 52. When the wick reservoir 39 and extra oil space or reservoir 37 are filled, the cap 47 is lowered into place and is doubly secured by lid of journal box being shut.

The oil level is, of course, indicated by the indicator device 54. The device is arranged so that when it indicates a low level the reservoirs are not completely empty but has a considerable reserve as a safety factor and the low oil will be raised to the journal bearing face by the capillary action of the wicks.

When the oil is at the high level the lower portion of the journal bearing face will be immersed therein so that the journal licks up oil directly from the reservoir as said journal rotates. The curved portions of sides 35a of the body act as wipers to remove surplus oil from said journal face, leaving the required oil film only.

While the oil level may be quickly checked by raising the lid 16 of the journal box and noting the position of float top 54 it is to be noted that a double check may be had by raising the cover 47 of the lubricator and when the oil level is high the oil may be seen in the reservoir 37 through the passage 70. It is also to be noted that a drip 73 is provided in passage 70 to prevent splashed oil from leaking out the filling opening 46.

It has been found that the neoprene body, due to its elastic nature, makes possible the use of grease instead of oil as a lubricant for lubricating the journal 20 and its associated bearing 25. This is accomplished by eliminating the bearing 52 with its associated rod and air vent, and the filling spout assembly with its opening to outside atmosphere. The reservoirs 37 and 39 being completely sealed against outside atmosphere when installed in operating position under the journal. In lieu of the filling spout provided with an opening for oil, a compression injection valve or grease fitting (not shown) is placed in the top wall part 31, in a position to be readily and easily connected to a grease pressure hose with a fitting for injecting grease under pressure into the reservoirs. Surplus air in the reservoirs is exhausted through a spring controlled valve (not shown) likewise installed in wall part 31. When the pressure hose is connected to the injection valve, grease is forced into the reservoirs and into contact with the lower portion of the journal face. When grease is forced into the reservoirs, the elastic properties of the body and the reservoir walls permit a controlled amount of expansion of the reservoirs similar in effect to a distended diaphragm. The only escape of the compressed grease is by way of the film licked up and carried by the rotating journal 20 to the bearing 25 and as the grease adjoining the journal face is used up in lubricating the journal and bearing, the compression in the reservoir together with the contracting to normal position of the distended body and reservoir walls causes additional grease to shift to the face of the rotating journal.

Installation of the lubricator device into the journal box is described above and in order to facilitate insertion of the lubricator device into the journal box in which it is moulded to fit, a metal cup 75 having an outwardly extending annular flange 76 is moulded into the end wall 77 of the body of the device, the open end of the cup facing the outer end of the body. Fabric reenforcing 100 may be moulded into the body and into the inner wall 77 surrounding the metal cup 75 or elsewhere as needed for additional strength in view of the pushing process used in installing said device. A push rod of suitable form and/or shape may be inserted through the segment of the arc of the groove 32 and between wicks in wick chamber 39, with the inner end positioned in said cup. With the journal positioned in the box as hereinbefore described the lubricator device is pushed into position without danger or injury to said device. The brass and wedge are then placed in working position as above described, with the result there set forth.

In order to provide an effective dust seal or stop the body of the lubricator device has an arcuate, inwardly extending flange 79 which is formed integrally with said body. When in operative position the flange 79 extends inwardly along the lower portion of the inner journal collar 24 and is in contact with the lower face of said inner collar and the outer face of inner wall of the "waste" chamber of the journal box thereby preventing the entrance of foreign material into the journal box through the lower portion of the inner opening into said box. The flange 79, being resilient, and supported by wall 77 of body 30 which is under compression when in operative position provide compensation for wear and for journal "shift" so as to maintain an effective dust seal or stop adjacent the lower portion of the journal.

Figure 6:
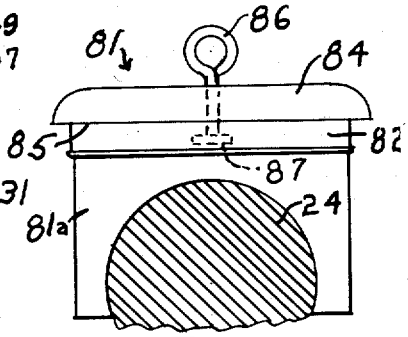
Fig. 6 is an end view of the top dust seal.
Figure 5:
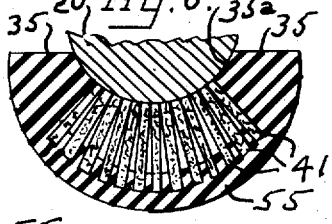
Fig. 5 is a section taken on line 5—5 of Fig. 2.

In order to complete the dust seal over and around the upper portion of the journal adjacent the inner collar 24 the upper dust seal device shown in Fig. 6 is provided. This device is indicated generally at 81 and is of suitable material such as neoprene and is inserted in the conventional dust guard slot 80 of the journal box. The sides and ends of the top portion of the upper dust seal device are preferable slightly smaller than the inside dimensions of the slot 80 so as to facilitate insertion of the device. The upper portion 82 of the device 81 which enters the slot 80 is slightly larger than said slot so that the offset portion 82 requires a certain amount of force or driving to complete the installation of the upper portion of the seal. This will insure that the seal will not be inadvertently displaced or lost in traffic. The enlarged portion 84 has a lower or under face 85 which engages the upper wall of the journal box and thus provides an effective top seal against rain and dirt. The eye 86 is formed of wire or the like and has an end portion 87 anchored in the body of material forming the slab seal 81. This eye provides an easy and handy means for removing the upper part of dust stop 81. The lower portions 81a of this upper part of dust stop in association with flange 79, completely encircles the inner collar 24 and closes the conventional inner opening into the journal box against the entrance of dust and eliminates the present method of sealing the top of the dust guard slot adjacent the inner end of the box 15 by the use of waste packing and asphaltic roofing cement.

Neoprene has been found to be highly satisfactory material from which to construct the body and seal 81 of the present device as it is resistant to decay caused by oil.

Another advantage of the use of a material such as neoprene is the elimination of so called "smoke" or "stink" bombs which are presently in use on many trains to assist in the detection of hot bearings or hot journals or hot boxes and the like. It has been found that the neoprene or synthetic rubber of the oil resistant type, when heated to a point well below the melting temperature of babbitt gives off a dense black smoke the odor of which is most offensive to the human sense of smell. In the event the present lubricator should run dry due to neglect, oversight, or any accidental or inadvertent cause, the material of which it is composed will heat up and give off the dense black smoke and offensive odor above referred to thereby give warning of impending bearing trouble in time for the train crew to take corrective measures before really serious trouble develops.

Whereas the invention has been described with reference to specific embodiments, it is not intended to limit the scope of the invention to the details disclosed or otherwise than by the terms of the appended claims.

We claim:

1. The combination with a journal box having a top wall with a slot therein, an openable cover and a journal having an outer end collar and an inner collar, of a lubricator and sealing means, said lubricator comprising a body of oil resistant, resilient material with a generally semi-circular bottom wall and an upper wall, said upper wall having an outer end portion substantially horizontal, an arcuate transverse groove adjacent the inner end of said portion receiving said outer collar, an arcuate groove adjacent the inner end of the body receiving the inner collar, and an intermediate concave portion receiving the lower portion of the journal, said upper wall also including portions extending longitudinally along the sides of said grooves and intermediate concave portion, said body having a pair of longitudinally spaced chambers, the chamber at the outer end of the body being an oil storage reservoir, the other chamber being located under the journal and having an open upper end; a passageway interconnecting the lower portions of said chambers; vent means interconnecting the upper portions of said chambers; a plurality of self supporting wicks having their lower ends moulded in the bottom wall of the body and having their upper ends extending through the opening in said other chamber and pressing against the adjacent portion of the journal; an arcuate flange extending longitudinally rearwardly at the inner end of the body, closely about the inner collar and snugly against the inner wall of the journal box to form an inner dust stop; a filling spout upstanding from said horizontal wall portion and having an outwardly turned neck open at the outer end and terminating at an angle substantially the same as the angle of the cover of said journal box and adjacent said cover; and openable lid for the filling opening, said lid when closed being held closed by the journal box cover when the latter is closed; means yieldingly urging the lid closed, and level indicating means including a float within the storage reservoir, a rod upstanding from said float and extending through an opening provided therefor in said horizontal wall portion, an indicator mounted at the upper end of said rod; and outwardly facing flanged cup in the inner end wall of said body; and a dust stop at the inner end of the journal box comprising a relatively thin member of oil resistant material having an arcuate inner collar receiving notch, said member being removably received in the slot in the top wall of the journal box, said member having a thickened resilient portion adjacent the top tightly receivable in said slot and securely retained therein; an elongated cap portion at the upper end of said dust stop member having outwardly extending shoulders engageable with the upper surface of the journal box wall; and an upstanding part fixed in said member to provide means for removing said member.

2. The combination with a journal box having an openable cover and a journal with an end collar and an inner collar, of a lubricator device therein comprising a body of resilient material having top and bottom walls, the upper wall having a pair of longitudinally spaced transverse arcuate grooves receiving the respective collars and a concave intermediate portion in which the lower portion of the journal is received, said body having a pair of longitudinally spaced oil reservoirs, the outer reservoir being for storage of oil and the other reservoir having an opening at the top communicating with said concave intermediate portion; a plurality of wicks in said other reservoir having their lower end portions moulded in the lower wall of the body and having their upper ends extending through the opening in said other reservoir and engaging the adjacent surface of the journal, said upper wall having longitudinally extending portions at the sides of said grooves and concave portion which engage the journal and wipe off surplus oil therefrom.

3. The combination with a journal box having an openable cover and a journal with an outer end collar and an inner collar, of a lubricator device comprising a body of resilient material having top and bottom walls, the upper wall having a pair of longitudinally spaced transverse arcuate grooves receiving the respective collars and an arcuate intermediate portion in which the lower portion of the journal is received, said body having a pair of longitudinally spaced oil reservoirs, the outer reservoir being for storage of oil and the other reservoir having an opening at the top communicating with said arcuate intermediate portion; and a plurality of wicks in said other reservoir having their lower end portions secured in the lower wall of the body and having their upper ends extending through the opening in said other reservoir and engaging the adjacent surface of said journal, said upper wall having longitudinally extending smooth portions at the sides of said grooves and arcuate portion which wipingly engage the journal when the journal is rotating for retaining surplus oil in said other reservoir, the level of the oil in the reservoirs being above the bottom of said arcuate intermediate portion when said reservoirs are substantially full.

4. The combination with a journal box having a top wall with a slot therein and a journal shaft having a journal, an end collar and an inner collar, of a journal lubricator and box sealing means comprising a body of resilient oil resistant material having an oil reservoir therein, the upper side of said body having recess means receiving the lower portion of said journal and collars, said reservoir having an opening communicating with the recess portion receiving the journal; capillary means located in the reservoir and contacting the adjacent journal surface through said opening for carrying oil to said adjacent journal surface; and a seal including a flange on the inner end of the body and a relatively thin member removably disposed in said slot and having an inner collar receiving notch in the inner end portion, the inner end of said member engaging the upper side of said body adjacent the inner end thereof, said member having a thickened upper end portion snugly received in the slot, and an enlarged cap portion engaging the upper surface of the top wall of the journal box.

5. A journal lubricating device, comprising: a body of resilient oil resistant material having upper and lower walls, the lower wall being generally semicircular in cross-section, the upper wall having an outer end portion substantially flat and arranged in a generally horizontal plane, an arcuate transverse groove adjacent the inner end of said flat portion for reception of the free end collar of a journal shaft, an arcuate transverse groove adjacent the inner end of said body for reception of a portion of the inner collar of said journal shaft, and an intermediate concave recess portion extending longitudinally and centrally of the body for snug reception of said journal, said upper wall including side portions extending longitudinally along the sides of said groove and intermediate concave portion, said body having a pair of longitudinally spaced chambers, the chamber at the outer end of the body being an oil storage reservoir, the other chamber being disposed under the journal and having an opening at the top; a passageway interconnecting the lower portions of said chambers; vent passages interconnecting the upper portions of said chambers; a plurality of self-supporting wicks having lower end portions moulded into the bottom wall of the body and having their upper ends extending through the opening in said other chamber for contact with the adjacent portion of the journal; a journal box sealing flange extending longitudinally at the inner end of the body; a filling spout upstanding from said flat wall portion and having an outwardly turned neck with a filling opening at the free end; openable cover means for said filling opening; yielding means urging said cover closed; and oil level indicating means including a float in the outer chamber, a rod extending from said float through an opening in the flat wall portion, and a member carried by said rod providing a visual level indication.

6. In a lubricator device: a body of resilient, oil resistant material, the upper wall of said body being partially flat, having an arcuate transverse groove adjacent one end, an arcuate transverse groove spaced longitudinally of the first mentioned groove, and an intermediate arcuate portion having a smaller radius than the radii of said grooves, and extending longitudinally of the body between said grooves with transverse walls supporting said portion and grooves, said upper wall including wall portions extending at the sides of said grooves and intermediate arcuate portion, said body having a pair of longitudinally spaced chambers, one of said chambers being an oil storage reservoir, the other of said chambers being a direct oil dispensing member and located under the intermediate arcuate portion and having an opening communicating therewith; means interconnecting said chambers; and means venting said chambers through said body from a point adjacent the top of the opening in said intermediate arcuate portion.

7. The invention defined by claim 6, wherein there is liquid level indicating means with an enlarged upper portion positioned above the top side of the storage reservoir.

8. In a device of the class described: a body of resilient material, the upper wall of said body having an arcuate transverse groove adjacent one end, an arcuate transverse groove spaced longitudinally thereof, and an intermediate arcuate portion having a smaller radius than the radii of the transverse grooves and extending between said grooves said upper wall including side portions extending at the sides of said grooves and intermediate arcuate portion, said body having a pair of spaced chambers with a common partition one of which chambers is located under the intermediate arcuate portion and having an opening communicating therewith, the other chamber being a reserve reservoir, there being liquid and air conveying means interconnecting said chambers through said common wall, the level of liquid in said chambers being above the bottom of said intermediate arcuate portion when said chambers are substantially filled; and a plurality of resiliently self-supporting wicks in the one chamber, the upper ends of said wicks extending through the opening of said chamber.

9. The invention defined by claim 6, wherein there is flexible reinforcing means encased in the body of the lubricator for adding strength to said body.

10. The combination with a journal box having a journal shaft therein and a bearing and wedge therefor, of a lubricator comprising a resilient semi-cylindrical body of material with oil resistant characteristics, there being end walls spaced apart longitudinally, and said body having a generally convex bottom portion supporting a longitudinally extending arcuate upper portion formed to sealingly receive said journal shaft, said body being adapted to be compressively maintained in the space under the bearing and between the journal and the adjacent wall of the journal box, said body also having an opening with a perimeter sealed by said journal shaft when said journal shaft is at rest in said arcuate portion and extending into [a sealed] *an* oil space adapted to retain excess oil and positioned in said body adjacent the convex portion thereof; means for compressing said body against said journal shaft, said means comprising said bearing and wedge therefor for varying the space between the journal shaft and the lower wall of said journal box; wicks leading from said oil space to the face of the journal shaft inside the sealed opening in said arcuate portion of said body, said body also having air vents leading to the outside atmosphere for filling the oil space; and [sealable] filling means for replenishing the supply of oil when same has been depleted, said journal shaft being adapted to retain a film of oil from said wicks when said shaft is rotated.

11. In a lubricator for a horizontal shaft having a bearing: an elongated body of impervious material with end walls spaced apart [and intermediate walls joining said end walls], said body having an oil space in the lower portion thereof and a longitudinally extending shaft receiving arcuate groove spaced upwardly from the lower portion of said body, with radii centered in a line above the nadir of said groove, there being an opening in said groove extending downwardly to said oil space; a shaft occupying said groove, said oil space being adapted to have a high level supply of oil extending upwardly to a point above the lower face of said shaft, the face thereof being adapted to retain a film of oil when said shaft is rotated, [a] *the inner* portion of the perimeter of said opening in said groove *having sealing means extending around* [being oil-sealed about] said shaft and the remaining portion of said perimeter being united in *oil sealed* [operating] engagement with adjoining parts of the bearing *forming an oil sealed enclosure* [, said oil space in said body being vented to outside atmosphere through said body above the top of the high level of the oil]; and [sealable] filling means [extending into] *communicating with* said oil space for replenishing the supply of oil therein.

12. The invention defined by claim 11 wherein there is oil conveying means within the oil space for transmitting oil from the bottom of the oil reservoir to the face of the journal through the opening in said groove.

13. The combination with a shaft having a bearing, of a lubricator with a housing and fastening therefor, said lubricator comprising a body of impervious grease resistant material having the housing spaced outwardly of said shaft in opposed relation to the bearing, said body having an arcuate shaft receiving portion snugly fitting against said shaft; an oil chamber located in the interior of said body and extending to said shaft inside said arcuate portion; said chamber being adapted to have a supply of lubricant emersing the lower face of the shaft, said face retaining a film of said lubricant when rotated; means for compressing said shaft receiving portion sealingly against said shaft and bearing, said means comprising said fastenings for gaining said compression space between said shaft and bearing, and the housing of said lubricator; said lubricator and said shaft being adapted to cooperate in retaining excess lubricant in said chamber; and sealable filling means with cooperable exhaust means of predetermined resistance incorporated in said body for replenishing said lubricant when the supply in said chamber has been reduced.

14. The combination with a shaft having a bearing, of a lubricator with a housing and fastening therefor, said lubricator comprising a body of impervious grease resistant material having the housing spaced outwardly of said shaft in opposed relation to the bearing, said body having an arcuate shaft receiving portion snugly fitting against said shaft; an oil chamber located in the interior of said body and extending to said shaft inside said arcuate portion; lubricant conveying means within said chamber adapted to transmit lubricant therefrom to the face of said shaft, said chamber being adapted to have a supply of lubricant in direct contact with the face of the shaft, said face retaining a film of said lubricant when rotated; means for compressing said shaft receiving portion sealingly against said shaft and bearing, said means comprising said fastenings for gaining said compression space between said shaft and bearing, and the housing of said lubricator; and sealable filling means with cooperable exhaust means of predetermined resistance incorporated in said body for replenishing said lubricant when the supply in said chamber has been reduced.

15. The combination with a housing, a rotatable shaft having a portion disposed in said housing, a wedge and bearing for said shaft; of a lubricator comprising a body of resilient material, having the characteristic of resistance to decay caused by grease, said body having a chamber located in the interior thereof and an opening in said concave portion leading from said chamber to said shaft; said body of material being adapted to be compressively disposed between a portion of said housing and said shaft when said bearing and wedge are restored to normal position so that said shaft receiving portion engages said shaft portion; said shaft receiving portion and said shaft portion being adapted to cooperate to retain excess lubricant in said chamber when said shaft is static; a supply of lubricant in said chamber adapted to be in direct contact with the adjoining face of said shaft, said face being adapted to retain a film of said lubricant when said shaft is rotated; and sealable filling means for said chamber for providing lubricant under pressure to said chamber, the resilience of said body permitting expansion thereof and the subsequent forcing of said lubricant to the shaft.

16. The combination with a journal housing, a rotatable shaft having a portion thereof disposed in said housing; of a lubricator body having a smooth concave shaft receiving channel, said body being of resilient material which is resistant to decay caused by oil and disposed under compression against said shaft, said body having an oil chamber located in the interior thereof and an opening leading from said chamber to the face of the shaft portion in said concave channel, the upper edges of said opening cooperating with said shaft portion to retain excess oil in said chamber; a high level supply of oil in said chamber adapted for direct distribution to said shaft; lubricant applicator means secured in said chamber and position to raise the oil from a low level in said chamber to said shaft when the level of oil in said chamber drops, said shaft, when rotated, being adapted to hold a film of said oil; and closable means for providing access to the chamber to replenish the oil in said chamber when the supply therein has been reduced.

17. The invention defined by claim 6 wherein there is oil conveying means within the chamber for transmitting the oil from the bottom of said chamber to points above the nadir of the opening in the intermediate arcuate portion.

18. In combination: a journal housing; a rotatable shaft having at least a portion thereof disposed in said housing; and a lubricator body having a concave shaft receiving channel, said body being of resilient material which is resistant to decay caused by oil and disposed under compression against said shaft, said body [having an] *defining* oil [chamber located] *storage means* in the interior thereof and [a] *passageway means for* lubricant [way leading] *to pass* from *the interior of* said [chamber] *body* to said [concave channel] *rotatable shaft,* [said shaft and] said body *including surface area about said passage means pressing against said shaft sufficiently to limit the application of oil to the face of said shaft to a thin film and* [cooperating] to retain excess oil in said [chamber] *body.*

19. A lubricator device, including a body having a concave shaft receiving channel, said body being of resilient material which is resistant to decay caused by oil, said body having an oil chamber located in the interior thereof and a connection for lubricant between said chamber and said concave channel; and a cup embedded in one wall of said body.

*20. In combination: a journal housing; a rotatable shaft having at least a portion thereof disposed in said housing; and a lubricator body having a concave shaft receiving channel, said body being of resilient material which is resistant to decay housed by oil and disposed under compression against said shaft, said body having an oil chamber located in the interior thereof and a lubricant way leading from said chamber to said concave channel, said shaft and said body cooperating to retain excess oil in said chamber.*

References Cited in the file of this patent or the original patent

UNITED STATES PATENTS

| | | |
|---|---|---|
| 65,857 | Alexander | June 18, 1867 |
| 368,774 | MacMahon | Aug. 23, 1887 |

(Other references on following page)

UNITED STATES PATENTS

| | | |
|---|---|---|
| 670,034 | Richard | Mar. 19, 1901 |
| 790,220 | Monroe et al. | May 16, 1905 |
| 899,352 | Stewart | Sept. 22, 1908 |
| 1,001,127 | Doeg | Aug. 22, 1911 |
| 1,155,932 | Kessler | Oct. 5, 1915 |
| 1,612,024 | Jacobs | Dec. 28, 1926 |
| 1,673,399 | Cutting | June 12, 1928 |
| 2,138,971 | Keeler et al. | Dec. 6, 1938 |
| 2,141,897 | Behrmann | Dec. 27, 1938 |

| | | |
|---|---|---|
| 2,150,935 | Miller | Mar. 21, 1939 |
| 2,241,870 | Scribner | May 13, 1941 |
| 2,534,045 | Massy | Dec. 12, 1950 |
| 2,571,235 | Hamer | Oct. 16, 1951 |
| 2,581,020 | Hulson | Jan. 1, 1952 |
| 2,608,751 | Hutton | Sept. 2, 1952 |
| 2,686,089 | Nardulli et al. | Aug. 10, 1954 |
| 2,692,804 | Corcoran | Oct. 26, 1954 |
| 2,700,208 | Messimer | Jan. 25, 1955 |
| 2,742,331 | Hamer | Apr. 17, 1956 |